United States Patent
Butz et al.

(10) Patent No.: US 8,315,826 B2
(45) Date of Patent: Nov. 20, 2012

(54) DIAGNOSTIC METHOD FOR A BALL BEARING, IN PARTICULAR FOR AN ANGULAR-CONTACT BALL BEARING, A CORRESPONDING DIAGNOSTIC SYSTEM, AND USE OF THE DIAGNOSTIC SYSTEM

(75) Inventors: Felix Butz, Köln (DE); Karl Gebert, Schweinfurt (DE)

(73) Assignee: Siemens Aktiengesellschaft, München (DE)

( * ) Notice: Subject to any disclaimer, the term of this patent is extended or adjusted under 35 U.S.C. 154(b) by 544 days.

(21) Appl. No.: 12/475,890

(22) Filed: Jun. 1, 2009

(65) Prior Publication Data
US 2009/0299663 A1    Dec. 3, 2009

(30) Foreign Application Priority Data
Jun. 2, 2008  (EP) .................................. 08010064

(51) Int. Cl.
- *G01F 17/00*   (2006.01)
- *G01F 23/00*   (2006.01)
- *G01L 7/00*    (2006.01)
- *G01N 11/00*   (2006.01)

(52) U.S. Cl. ................ 702/56; 702/183; 702/185
(58) Field of Classification Search .............. 702/34, 702/35, 42, 43, 56, 75, 183, 185; 384/448, 384/490, 548
See application file for complete search history.

(56) References Cited

U.S. PATENT DOCUMENTS

| | | | |
|---|---|---|---|
| 5,495,764 A * | 3/1996 | Matsuzaki et al. | 73/593 |
| 6,494,046 B1 * | 12/2002 | Hayess | 60/779 |
| 6,553,837 B1 | 4/2003 | Lysen | |
| 7,287,910 B2 * | 10/2007 | Kobayashi et al. | 384/484 |
| 7,860,663 B2 * | 12/2010 | Miyasaka et al. | 702/35 |
| 2002/0118900 A1 * | 8/2002 | Takamizawa et al. | 384/516 |
| 2002/0139191 A1 * | 10/2002 | Hedeen et al. | 73/593 |
| 2003/0066352 A1 * | 4/2003 | Leamy et al. | 73/593 |
| 2006/0167659 A1 * | 7/2006 | Miyasaka et al. | 702/185 |
| 2007/0118333 A1 * | 5/2007 | Miyasaka et al. | 702/183 |
| 2008/0083280 A1 * | 4/2008 | Filbry | 73/593 |
| 2008/0234964 A1 * | 9/2008 | Miyasaka et al. | 702/113 |
| 2009/0103844 A1 * | 4/2009 | Kobayashi et al. | 384/462 |

FOREIGN PATENT DOCUMENTS

| | | |
|---|---|---|
| DE | 197 02 234 A1 | 8/1998 |
| DE | 10 2004 050 897 A1 | 5/2006 |
| RU | 2232310 C2 * | 7/2004 |

\* cited by examiner

*Primary Examiner* — Michael Nghiem
*Assistant Examiner* — Yaritza H Perez Bermudez
(74) *Attorney, Agent, or Firm* — Henry M. Feiereisen, LLC

(57) ABSTRACT

In a diagnostic method for at least one ball bearing, in particular for an angular-contact ball bearing for bearing a rapidly rotating spindle, mechanical vibration caused by the respective angular-contact ball bearing is acquired by at least one vibration sensor and outputted as a corresponding vibration signal. At least one bearing characteristic, fundamental kinematic frequency dependent on a current bearing rotational frequency is determined by computation. A corresponding bearing frequency in a measurement frequency spectrum of the respective vibration signal is determined by measurement. A first diagnostic message is output when at least one of the determined bearing frequencies deviates by a respective prescribed frequency deviation from the corresponding computational fundamental kinematic frequency.

12 Claims, 3 Drawing Sheets

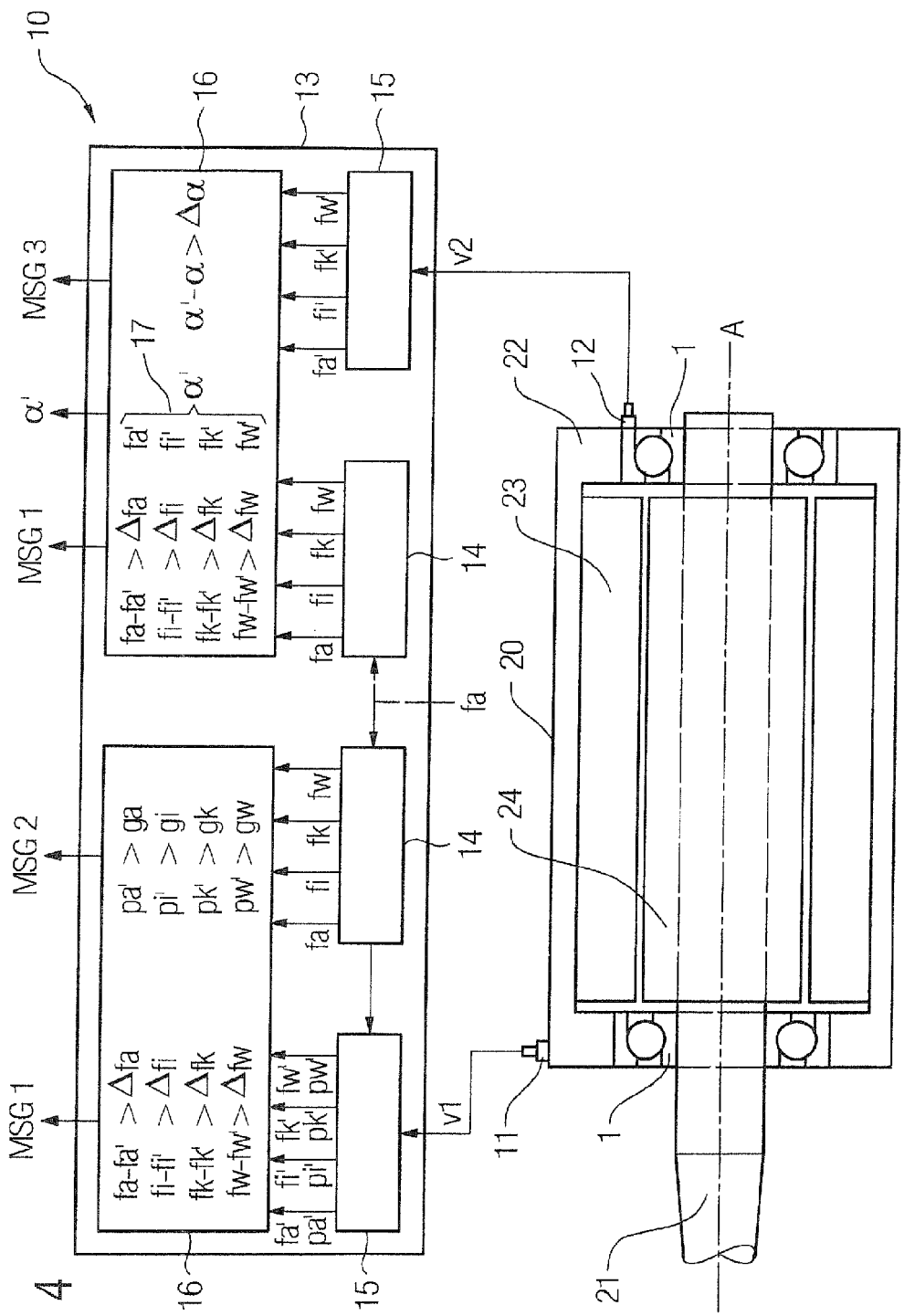

DIAGNOSTIC METHOD FOR A BALL BEARING, IN PARTICULAR FOR AN ANGULAR-CONTACT BALL BEARING, A CORRESPONDING DIAGNOSTIC SYSTEM, AND USE OF THE DIAGNOSTIC SYSTEM

CROSS-REFERENCES TO RELATED APPLICATIONS

This application claims the priority of European Patent Application, Serial No. EP 08010064, filed Jun. 2, 2008, pursuant to 35 U.S.C. 119(a)-(d), the content of which is incorporated herein by reference in its entirety as if fully set forth herein.

BACKGROUND OF THE INVENTION

The present invention relates to a diagnostic method and system for at least one ball bearing, in particular for at least one angular-contact ball bearing for bearing a rapidly rotating spindle, and also to a use of such a diagnostic system for diagnosing at least one ball bearing, in particular at least one angular-contact ball bearing, for bearing a spindle of a spindle system, in particular of a machine tool.

The following discussion of related art is provided to assist the reader in understanding the advantages of the invention, and is not to be construed as an admission that this related art is prior art to this invention.

Ball bearings of a type involved here include deep groove ball bearings and, in particular, angular-contact ball bearings. The latter are designed to absorb both axial and radial forces with reference to their rotational axis. They are mostly installed and prestressed in pairs in order to support a shaft. Such angular-contact ball bearings can be of single row or as double row design. Furthermore, such angular-contact ball bearings have a bearing inner race and a bearing outer race with a multiplicity of interposed bearing balls guided in a bearing cage. The ability to be able to absorb both axial and radial forces is achieved by inclining the rolling paths of the bearing balls. A measure of the inclination is the so-called pressure angle $\alpha$. Typical values are at 15°, 18°, 25° or 45°. Other pressure angles are also possible.

By comparison therewith, deep groove ball bearings have a pressure angle of 0°. They are designed, in particular, to absorb radial forces.

Spindle systems with rapidly rotating spindles or spindle shafts are typically supported in two angular-contact ball bearings. This makes possible axial and radial guidance of the spindle shaft. Such rapidly rotating spindle systems serve to hold, for example, a work piece, a tool, a milling head or a drill. Such spindle systems are frequently part of a machine tool.

In such spindle systems, continuous monitoring of the angular-contact ball bearings is frequently necessary or even prescribed, in order to detect, preferably to predict, a failure or an indicated failure. However, this has so far not been possible with a sufficiently high reliability, since there are no generally valid, informative limit values relating to the probability of failure of rapidly rotating angular-contact ball bearings. It Although limit values suitable for specific machines depending on process, in particular machine tools, can be determined for spindle systems fabricated in large piece numbers. However, these limit values can be transferred only conditionally to similar machine tools and similar processes. Because of the high outlay on metrology and of the high costs associated therewith, no automated analysis of angular-contact ball bearings is currently undertaken.

In order to diagnose rapidly rotating angular-contact ball bearings, it is also known to apply acceleration sensors in the vicinity of angular-contact ball bearings and to evaluate the acquired acceleration signals. Thus, for example, the total value can be formed together with vibration data corresponding to the acceleration signals, in order to signal a variation in the bearing state given a variation in the total value. However, it is mostly impossible here to assign the vibration data clearly to the respective affected machine component or to a present cause.

As an alternative, methods are known that perform a frequency selective evaluation of the acquired vibration data. By contrast with the evaluation of the total signals, it is possible when conducting frequency selective evaluation to demonstrate individual causes of fault, and to assign the machine elements affected. In this case, the time signal is decomposed by means of a Fourier transformation into the corresponding sinusoidal vibration components. The respective amplitudes or levels of the associated frequencies are displayed in the spectrum. However, spectra cannot be used for early detection of rolling bearing defects, because the extremely low energy defect components or frequency components are mostly covered by high energy machine vibrations.

In another alternative method, the spectrum of the envelope can be determined from the acceleration signal. This method can used to separate the periodic force pulses that arise when a defect in a bearing is rolled over and are superposed on one another in the machine vibrations. In this process, the time signal modulated by defect pulses is demodulated, that is to say the envelope is separated and subjected to frequency analysis. Given suitably filtered time signals, it is only exclusively information relating to periodic rolled-over defects that is displayed in the spectrum.

Stochastic signal components are suppressed, with the result that even small defects can be displayed independently of the machine vibrations, which are substantially higher in energy. This method has a comparatively good signal-to-noise ratio, and it is, in addition, relatively insensitive to rotational speed fluctuations. Instances of early damage can mostly be detected easily with this method. In addition, it is possible to analyze the damage growth with time in the rolling bearings.

Disadvantageously, these measurements and the required outlay on parameterization for a respective angular-contact ball bearing and for the affected machine are complex.

It would therefore be desirable and advantageous to provide an improved diagnostic method and system for at least one ball bearing, in particular for at least one angular-contact ball bearing to obviate prior art shortcomings.

SUMMARY OF THE INVENTION

According to one aspect of the present invention, a diagnostic method for a ball bearing includes the steps of measuring mechanical vibrations produced by the ball bearing with a vibration sensor and generating a corresponding vibration signal having a frequency spectrum, computing at least one fundamental kinematic frequency, with the fundamental frequency depending on a current rotation frequency of the ball bearing, determining from the measured frequency spectrum at least one bearing frequency, and outputting a first diagnostic message when the at least one bearing frequency deviates from the at least one fundamental kinematic frequency by a predefined frequency deviation.

According to the invention, at least one bearing characteristic, fundamental kinematic frequency dependent on a current bearing rotational frequency is determined by computation. In each case a corresponding bearing frequency in a measurement frequency spectrum of the respective vibration signal is determined by measurement. A first diagnostic message is then output when at least one of the measured bearing frequencies deviates by a respective prescribed frequency deviation from the corresponding computational fundamental kinematic frequency. From the point of view of metrology, it is thereby possible to diagnose the respective ball bearing reliably in a particularly simple way.

The respective measured bearing frequencies are preferably monitored during operation in a respective frequency band formed around the current fundamental kinematic frequency. The first diagnostic message is outputted if one or more bearing frequencies "migrate" from the respective frequency band. This diagnostic message can also include information as to which of the bearing frequencies has deviated impermissibly from the associated fundamental kinematic frequency. The respectively prescribed or prescribable maximum permissible frequency deviation can come about because of a type test of the ball bearing, or because of the latter's technical design. In particular, the frequency deviation lies in the single digit percentage range with reference to the associated fundamental kinematic frequency.

The basic idea of the present invention is that the running properties of ball bearings are primarily defined by a range of fundamental kinematic variables. The geometric variables known for each ball bearing are dependent on the relative rotational speed between bearing outer race and bearing inner race, on the pitch circle diameter of the bearing, on the ball diameter and on the number of balls.

An acceptable bearing generates a broadband noise signal at a comparatively low amplitude. Its fundamental kinematic frequencies are therefore generally only weakly expressed. In the event of a slight variation in the roughness of the surface of the raceways or of the rolling bodies, that is to say the bearing balls, the noise signals become more intensive, by contrast. The stochastic vibrations in this case incite the connected components such as balls, bearing outer race and bearing inner race, as well as housing parts to structural resonances (natural frequencies). Consequently, a variation in the bearing running properties becomes noticeable firstly in the range of the resonances. Rolling bearing races and rolling bodies, in particular bearing balls, have natural frequencies far above said fundamental kinematic frequencies, the natural frequencies of the bearing cages usually lying in the range of the kinematic frequencies. In other words, it is therefore sufficient for the fundamental frequencies considered to be considered in only a small frequency range lying below the natural frequency. The outlay on measurement is in this case advantageously comparatively low.

According to another advantageous feature of the present invention, the fundamental kinematic frequencies may have the following characteristic:

rollover frequency of the bearing outer race:

$$fa=0.5 \cdot fn \cdot z \cdot [1-(DW/DT) \cdot \cos(\alpha)],$$

rollover frequency of the bearing inner race:

$$fi=0.5 \cdot fn \cdot z \cdot [1+(DW/DT) \cdot \cos(\alpha)],$$

rotational frequency of the bearing cage:

$$fk=0.5 \cdot fn \cdot [1-(DW/DT) \cdot \cos(\alpha)], \text{ and}$$

rollover frequency of a rolling body region:

$$fw=fn \cdot (DT/DW) \cdot [1-((DW/DT) \cdot \cos(\alpha))2],$$

wherein
fn is the rotational frequency of the ball bearing,
z is the number of the bearing balls,
DW is the diameter of the bearing balls,
DT is the pitch circle diameter of the ball bearing, and $\alpha$ is the pressure angle and has a value of 0° for a deep groove ball bearing as pure radial bearing. Typical pressure angle values in the case of an angular-contact ball bearing are 15°, 18°, 25° or 45°, the angular-contact ball bearing being able to absorb a higher axial force component with an increasing number of degrees.

The respective fundamental frequencies have fixed values, except for the variable rotational frequency of the ball bearing. The rotational frequency of the bearing can in this case be separated from the respective vibration channel, or be derived from a rotary transducer signal that originates from a rotary transducer connected to the spindle.

According to another advantageous feature of the present invention, the bearing frequency may be determined at a maximum amplitude at its respective position in the measurement frequency spectrum. The reliability of the diagnostic method is thereby increased. It is preferred to continue to measure the amplitude in the case of the respective bearing frequencies, and to "search for" the respective amplitude maximum in the frequency range around the expected, respective fundamental kinematic frequency.

According to another advantageous feature of the present invention, a second diagnostic message can be outputted when a maximum amplitude of at least one of the currently determined bearing frequencies exceeds a predefined limit amplitude. Moreover, by evaluating the height of the frequency amplitudes, i.e. the amplitude, it is possible to come to a conclusion on the mechanical loading of the ball bearing, increasing amplitude values indicating an increasing mechanical load.

According to another advantageous feature of the present invention, the at least one fundamental kinematic frequency can be a quantity depending on a nominal pressure angle between the bearing inner race and the bearing outer race of the respective ball bearing. The nominal pressure angle denotes the pressure angle dimensioned to design by the manufacturer. The fundamental idea with this method variant is that it is possible in the installed state of the bearing on a shaft to vary the operating pressure angle starting from the nominal pressure angle such as is present, for example, in the new state after the manufacture of an angular-contact ball bearing. Thus, the pressure angle can be influenced by prestressing the bearing or in a thermal fashion. In other words, changed conditions in the installed bearing can be inferred during operation from an operational change determined in the pressure angle. It follows that a qualitative assessment of a mounting process for an angular-contact ball bearing on a shaft, and a qualitative assessment of the setting of the prestressing of such a bearing are possible through evaluating the fundamental frequencies and the change derived therefrom in the pressure angle.

In particular, the respectively currently determined bearing frequency is mapped computationally into a current operating pressure angle. "Operating pressure angle" denotes the pressure angle, which varies during operation of the bearing. The mapping can be formed, for example, by means of a mathematical model. The model can be obtained, for example, from a CAD engineering system that describes the behavior of the bearing in terms of kinematics and material technology.

According to another advantageous feature of the present invention, a third diagnostic message can be outputted when the currently determined operating pressure angle deviates by a predefined maximum pressure angle deviation from the nominal pressure angle.

In the event the corresponding angular-contact ball bearings are not properly mounted, the effects of this are seen in the friction in the angular-contact ball bearings, in changes in the operating temperature and, finally, in steeply falling pressure angle values. Changes in the pressure angle can also result in the case of a change in the loading, or in the case of an excessive increase in the loading beyond a prescribed measure. In other words, overloaded states can be detected during operation and appropriate counter measures can be introduced when the pressure angle deviation determined exceeds the prescribed limit value.

The observation and assessment of the pressure angles determined is preferably performed with the aid of acceleration sensors that need be sensitive only in a relevant narrow frequency window. If, for example, the bearing frequency of the bearing outer race is displaced from the preselected frequency window, it can be inferred therefrom that operating conditions no longer correspond to the stipulations. Suitable protective measures can now be introduced.

According to another aspect of the present invention, a diagnostic system for a ball bearing includes at least one vibration sensor for measuring a mechanical vibration produced by the ball bearing and for outputting a vibration signal representative of the mechanical vibration, and a measurement evaluation unit operatively connected to the at least one vibration sensor, said measurement evaluation unit having computation means for determining at least one fundamental kinematic frequency that is characteristic for the bearing and depends on a current rotation frequency of the bearing, frequency measuring means for determining at least one bearing frequency from a measured frequency spectrum of the vibration signal, and comparison means for outputting a first diagnostic message when at least one measured bearing frequency deviates from the at least one fundamental kinematic frequency by a predefined frequency deviation.

The measurement evaluation unit may be realized as a microprocessor-assisted computer unit such as, for example, a microprocessor or a microcontroller.

The inventive diagnostic system is provided for diagnosing at least one ball bearing, in particular for diagnosing at least one angular-contact ball bearing, for supporting a spindle of a spindle system. Such a spindle system is typically a component of a machine tool, in particular in automation technology or manufacturing technology.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 4 shows, by way of example, a diagnostic system having a measurement evaluation unit with two connected vibration sensors for acquiring mechanical vibrations in the bearing region of a spindle system.

DETAILED DESCRIPTION OF PREFERRED EMBODIMENTS

Figure 1:
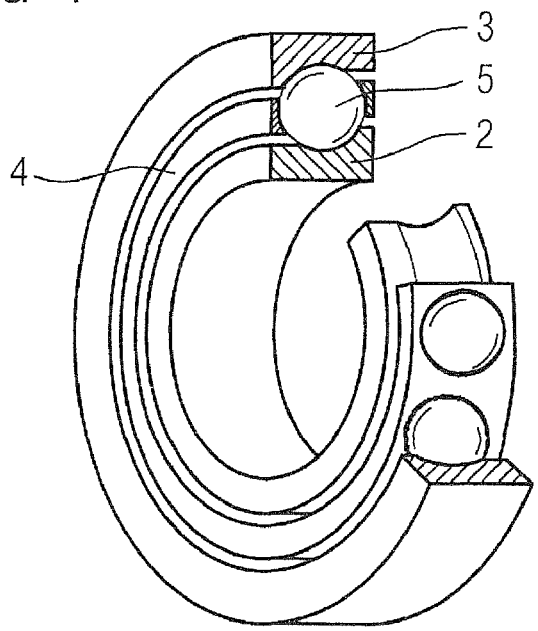
FIG. 1 shows a perspective view of an angular-contact ball bearing.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of an angular-contact ball bearing 1 as an example of a ball bearing. It has a bearing inner race, denoted by the reference 2, a bearing outer race 3 and a multiplicity of bearing balls 5 in a bearing cage 4 that are arranged between the two bearing races 2, 3.

Figure 2:
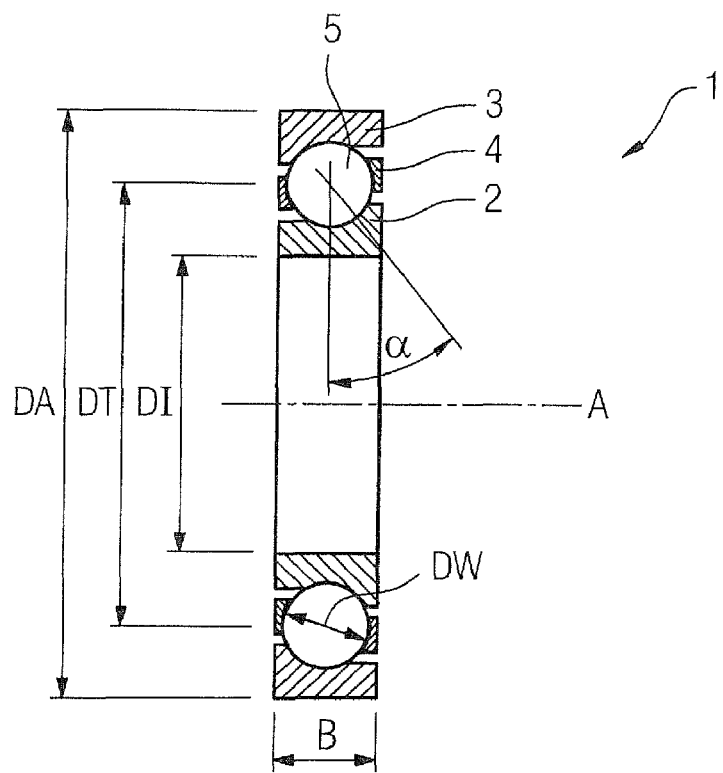
FIG. 2 shows an axial section through the angular-contact ball bearing in accordance with FIG. 1.

FIG. 2 shows an axial section through the exemplary angular-contact ball bearing 1 in accordance with FIG. 1. In this illustration, the inclination of the rolling paths between the bearing inner race 2 and the bearing outer race 3 by the pressure angle $\alpha$ is drawn in. In the present example this amounts to 40°, a pressure angle of 25° usually being standard. A denotes the axis of rotational symmetry or rotational axis of the angular-contact ball bearing 1. DI denotes the inside diameter, and DA the outside diameter of the angular-contact ball bearing 1. DT denotes the interposed pitch circle diameter of the angular-contact ball bearing 1. Moreover, the bearing 1 shown has an axial width B. DW denotes the diameter of one of the multiplicity of bearing ball 5.

Figure 3:
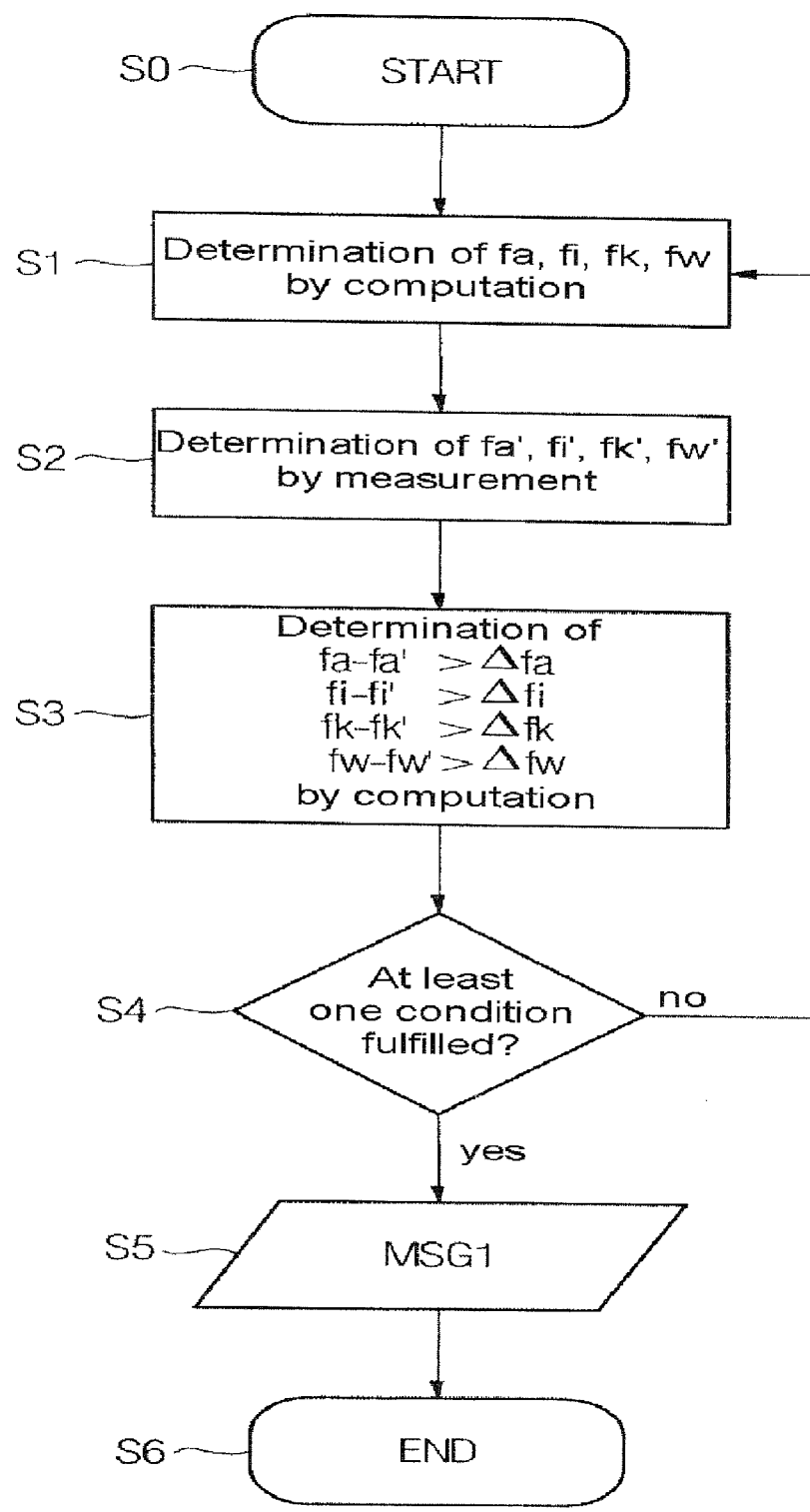
FIG. 3 shows a flow chart for carrying out the inventive diagnostic method.

FIG. 3 shows a flow chart for carrying out the inventive diagnostic method.

S0 denotes a starting step. What takes place, inter alia, in this step S0 is the initialization of the constant magnitudes for the number of the bearing balls, for the diameter of the bearing balls, for the pitch circle diameter of the ball bearing and for the nominal pressure angle as well as for the respective maximum permissible frequency deviations $\Delta fa$, $\Delta fi$, $\Delta fk$, $\Delta fw$.

In step S1 following thereupon, there are determined by computation the bearing characteristic, fundamental kinematic frequencies fa, fi, fk, fw dependent on a current bearing rotational frequency, that is to say a rollover frequency fa of a bearing outer race, a rollover frequency fi of a bearing inner race, a rotational frequency fk of a bearing cage and a rollover frequency fw of a rolling body region of the respective ball bearing 1. The mechanical vibration is preferably acquired by means of an acceleration sensor. Depending on application, it can also suffice to consider only one or two variables such as, for example, the fundamental frequencies fa or fi.

In step S2, a corresponding bearing frequency fa', fi', fk', fw' in a measurement frequency spectrum of the respective vibration signal is respectively determined by measurement.

In step S3, the respective differences are formed from the fundamental kinematic frequencies fa, fi, fk, fw and the corresponding measured bearing frequencies fa', fi', fk', fw', and the respective result is compared with the respective prescribed frequency deviation $\Delta fa$, $\Delta fi$, $\Delta fk$, $\Delta fw$.

A check is made in step S4 as to whether at least one of the conditions formulated in the previous step S3 is fulfilled. If this is not the case, return is made to step S1.

In the other case, a first diagnostic message MSG1 is output in step S5. This can be used to introduce appropriate counter measures such as, for example, shutting down the spindle system or the appropriate machine.

The final step is denoted by S6.

FIG. 4 shows by way of example a diagnostic system 10 having a measurement evaluation unit 13 with, for example, two connected vibration sensors 11, 12 for acquiring the respective mechanical vibrations on the illustrated spindle system 20.

A spindle system 20, in particular a motor-driven spindle system 20, is illustrated in the lower part of FIG. 4. This spindle system 20 can be a component of a machine tool. It has a spindle 21 that is guided both radially and axially in two angular-contact ball bearings 1. The two bearings 1 are permanently fitted in a machine housing 22 or spindle housing. Located between the two bearings 1 are a stator 23, arranged fixedly on the machine side, and a rotor 24, arranged fixed in terms of rotation on the spindle 21. During operation, the two angular-contact ball bearings 1 produce mechanical vibrations that are acquired by a vibration sensor 11 in the case of the left-hand bearing 1. This vibration sensor 11 is arranged on the spindle housing 22 in the vicinity of the left-hand bearing 1, that is to say indirectly on the bearing 1. By comparison therewith, the second vibration sensor 12 is fastened directly on the bearing 1 or on the bearing outer race thereof, in order to acquire the mechanical vibrations. V1, V2 denote the appropriate vibration signals.

The measurement evaluation unit 13 illustrated in the upper part of the FIG. 4 has means denoted by the reference symbol 14 for each vibration signal V1, V2. These means 14 are preferably software routines that, for example, determine by computation four bearing characteristic, fundamental kinematic frequencies fa, fi, fk, fw dependent on a current bearing rotational frequency fn. In the example in FIG. 4, an input possibility for the bearing rotational frequency fn is additionally drawn in with dashes. The bearing frequency fn can originate, for example, from a rotary transducer that is connected to the spindle shaft 21 of the spindle system 20. It can, alternatively, be determined by means of appropriate filter means (not further shown) from the respective vibration signal V1, V2. Furthermore, the measurement evaluation unit 13 respectively has a frequency measuring means 15 for determining in each case a corresponding bearing frequency fa', fi', fk', fw' in a measurement frequency spectrum of the respective acquired vibration signal V1, V2. fa' denotes the measured bearing frequency corresponding to the rollover frequency fa of the bearing outer race 3, fi' denotes the measured bearing frequency corresponding to the rollover frequency fi of the bearing inner race 2, fk' denotes the measured bearing frequency corresponding to the rotational frequency fk of the bearing cage 4, and fw' denotes the measured bearing frequency respectively corresponding to the rollover frequency fw of the rolling body region of the respective ball bearing 1. The bearing frequencies fa', fi', fk', fw' are preferably determined by computation by means of digital filters such as, for example, by means of an FFT (for Fast Fourier Transformation). Furthermore, an analog-to-digital converter can be connected upstream of the respective means 14, or already be present in the respective means 14 itself, and is used to convert the respective vibration signals V1, V2 into digital measured values for the purpose of further processing by computation.

The left-hand one of the two frequency measuring means 15 has, in addition, a amplitude meter for the purpose of respectively measuring a maximum amplitude pa', pi', pk', pw' of the currently determined bearing frequencies fa', fi', fk', fw'. In the simplest case, the frequency measuring means 15 are designed to search by computation for a local maximum in the region of the respective expected bearing frequency or the one to be tracked fa', fi', fk', fw'. In this case, the search is preferably respectively performed in a frequency range about the respective fundamental kinematic frequency fa, fi, fk, fw determined by computation by the associated means 14. The corresponding values for the fundamental frequencies fa, fi, fk, fw can be transmitted from the means 14 to the left-hand frequency measuring means 15 by a data link (not further denoted).

A comparing means 16 is connected downstream of the respective two means 14 and frequency measuring means 15. It serves for outputting a first diagnostic message MSG1 if at least one of the measured bearing frequencies fa', fi', fk', fw' deviates by a respective prescribed frequency deviation Δfa, Δfi, Δfk, Δfw from the corresponding computational fundamental kinematic frequency fa, fi, fk, fw. In addition, the left-hand comparing means 16 has means for outputting a second diagnostic message MSG2 if at least one measured maximum amplitude pa', pi', pk', pw' exceeds a respective prescribed limit amplitude ga, gi, gk, gw. By contrast, by way of example the right-hand comparing means 16 has means for outputting a third diagnostic message MSG3, if a currently determined operating pressure angle α' deviates by a prescribed maximum pressure angle deviation Δα from the nominal pressure angle α. To this end, the right-hand comparing means 16 can have mapping means 17 for mapping the currently determined bearing frequencies fa', fi', fk', fw' into a current operating pressure angle α' on the basis of a computational model. Finally, the right-hand comparing means 16 is designed also to output the computationally determined current operating pressure angle α', in order to process the latter further, if appropriate by means of a higher order control or diagnostic unit.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A diagnostic method for a ball bearing, comprising the steps of:
    measuring mechanical vibrations produced by the ball bearing with a vibration sensor and generating a corresponding vibration signal having a frequency spectrum;
    computing at least one fundamental kinematic frequency, with the at least one fundamental kinematic frequency depending on a current rotation frequency of the ball bearing and on a nominal pressure angle between a bearing inner race and a bearing outer race of the ball bearing;
    determining from the measured frequency spectrum at least one bearing frequency;
    computationally mapping the at least one bearing frequency to a current operating pressure angle;
    computing a deviation between the current operating pressure angle and the nominal pressure angle; and
    outputting a first diagnostic message when the deviation between the current operating pressure angle and the nominal pressure angle, is greater than a predefined maximum pressure angle deviation.

2. The diagnostic method of claim 1, wherein the at least one bearing frequency is determined as a frequency having a maximum amplitude at its respective frequency position in the measured frequency spectrum.

3. The diagnostic method of claim 1, further comprising the step of outputting a second diagnostic message when a maximum amplitude of the at least one bearing frequency exceeds of a predefined limit amplitude.

4. The diagnostic method of claim 1, wherein the at least one fundamental kinematic frequency is selected from the group consisting of a rollover frequency of a bearing outer race, a rollover frequency of a bearing inner race, a rotation frequency of a bearing cage, and a rollover frequency of a roll body region of the ball bearing.

5. The diagnostic method of claim 1, wherein the ball bearing is an angular-contact ball bearing.

6. A diagnostic system for a ball bearing, comprising:
   at least one vibration sensor for measuring a mechanical vibration produced by the ball bearing and for outputting a vibration signal representative of the mechanical vibration; and
   a measurement evaluation unit operatively connected to the at least one vibration sensor, said measurement evaluation unit having
      frequency measuring means configured to determine at least one bearing frequency from a measured frequency spectrum of the vibration signal,
      computation means configured to
      determine at least one fundamental kinematic frequency that is characteristic for the bearing and depends on a current rotation frequency of the bearing and on a nominal pressure angle between a bearing inner race and a bearing outer race of the ball bearing,
      computationally map the at least one bearing frequency to a current operating pressure angle;
      compute a deviation between the current operating pressure angle and the nominal pressure angle; and
      comparison means configured to output a first diagnostic message when the deviation between the current operating pressure angle and the nominal pressure angle is greater than a predefined maximum pressure angle deviation.

7. The diagnostic system of claim 6, wherein the ball bearing is an angular-contact ball bearing.

8. The diagnostic system of claim 6, wherein the frequency measuring means comprises an amplitude meter for measuring a maximum amplitude, with a frequency position of the maximum amplitude in the measured frequency spectrum determining the at least one bearing frequency.

9. The diagnostic system of claim 6, wherein the frequency measuring means comprises an amplitude meter for measuring a maximum amplitude of the at least one bearing frequency and means for outputting a second diagnostic message when the maximum amplitude exceeds a predefined limit amplitude.

10. The diagnostic system of claim 6, wherein the at least one fundamental kinematic frequency is a frequency selected from the group consisting of a rollover frequency of a bearing outer race, a rollover frequency of a bearing inner race, a rotational frequency of a bearing cage, and a rollover frequency of a rolling body region of the ball bearing.

11. The diagnostic system of claim 6, for use in the diagnosis of the ball bearing supporting a spindle of a spindle system.

12. The diagnostic system of claim 11, wherein spindle system is part of a machine tool.

\* \* \* \* \*